United States Patent
Anderes

(10) Patent No.: US 10,451,102 B2
(45) Date of Patent: Oct. 22, 2019

(54) QUICK-RELEASE FASTENER

(71) Applicant: Peter Anderes, Charlotte, NC (US)

(72) Inventor: Peter Anderes, Charlotte, NC (US)

( * ) Notice: Subject to any disclaimer, the term of this patent is extended or adjusted under 35 U.S.C. 154(b) by 200 days.

(21) Appl. No.: 15/469,552

(22) Filed: Mar. 26, 2017

(65) Prior Publication Data

US 2018/0274581 A1 Sep. 27, 2018

(51) Int. Cl.
| | | |
|---|---|---|
| *F16B 39/06* | (2006.01) | |
| *F16B 35/06* | (2006.01) | |
| *F16B 21/16* | (2006.01) | |
| *B60R 13/10* | (2006.01) | |
| *F16B 2/16* | (2006.01) | |
| *F16B 19/10* | (2006.01) | |
| *B60R 19/18* | (2006.01) | |

(52) U.S. Cl.
CPC ............ *F16B 35/06* (2013.01); *F16B 21/165* (2013.01); *B60R 13/105* (2013.01); *B60R 2019/1886* (2013.01); *F16B 2/16* (2013.01); *F16B 19/109* (2013.01)

(58) Field of Classification Search
CPC ........ F16B 35/06; F16B 37/14; F16B 37/145; F16B 39/06
USPC .......................................... 411/383, 388, 390
See application file for complete search history.

(56) References Cited

U.S. PATENT DOCUMENTS

| | | | | |
|---|---|---|---|---|
| 5,284,408 A | * | 2/1994 | Duran ....................... | F16B 2/04 411/33 |
| 5,494,390 A | * | 2/1996 | Gonzales ............... | B62K 25/02 280/281.1 |
| 5,582,496 A | * | 12/1996 | Ambrico ................. | F16B 39/12 411/243 |
| 6,532,702 B1 | * | 3/2003 | Scribner ................... | E06B 9/02 411/348 |
| 6,641,343 B1 | * | 11/2003 | Duran .................... | F16B 19/109 411/348 |
| 7,731,465 B2 | * | 6/2010 | Stapulionis ........... | F16B 21/165 292/252 |
| 7,891,903 B2 | * | 2/2011 | Klingenberg ......... | B25B 31/005 403/322.2 |
| 8,162,581 B2 | * | 4/2012 | Soltis .................. | B23B 31/1071 411/347 |

* cited by examiner

*Primary Examiner* — Roberta S Delisle
(74) *Attorney, Agent, or Firm* — Christopher C. Dremann, P.C.; Christopher C. Dremann

(57) ABSTRACT

A fastener for attaching a license plate to a vehicle includes a receiver having a shank portion and a head portion defining a recess, and an insert having a shank portion configured to be received within the recess defined by the head portion of the receiver and a head portion defining a recess for receiving a release mechanism within an interior of the shank portion and the head portion of the insert. The shank portion of the receiver is configured to secure the receiver to the vehicle. The shank portion of the insert is received within the recess defined by the head portion of the receiver with the license plate disposed between the head portion of the receiver and the head portion of the insert. A detent element of the release mechanism engages the head portion of the receiver to attach the license plate and the insert to the receiver and the vehicle. The release mechanism is depressed to release the detent element from the head portion of the receiver to remove the license plate and the insert from the receiver.

18 Claims, 5 Drawing Sheets

QUICK-RELEASE FASTENER

FIELD OF THE INVENTION

The present invention relates generally to a fastener for readily attaching a first object to a second object. More particularly, the invention relates to a quick-release fastener for readily attaching an object to a fixture or a structure. In an exemplary embodiment, the invention is a quick-release fastener for attaching a dealer plate to a vehicle such that the dealer plate can be quickly and easily attached to the vehicle and subsequently removed from the vehicle.

BACKGROUND OF THE INVENTION

It is oftentimes desirable to attach a first object to a second object in such a way that the first object can be readily attached to and removed from the second object. By way of example and not limitation, it may be desirable to attach an object, such as a sign, plaque or the like, to a fixture or a structure, such as a machine or a wall, in a manner that allows the object to be quickly and easily attached and removed without damaging the fixture or structure. The fixture or structure oftentimes has at least one internally threaded through opening or recess, or an internally threaded insert, configured to receive an externally threaded fastener, such as a bolt, screw or the like, having a complementary thread. An object having an opening, recess, slot or the like, is positioned over the threaded opening, recess or insert, and the fastener is threaded therein to attach the object to the fixture or structure. The process, however, can be time consuming and laborious, particularly in the event that numerous threaded fasteners are needed to securely attach the object to the fixture or structure.

A particular example of attaching a first object to a second object, fixture or structure occurs when an automobile dealership needs to temporarily attach a license plate to a vehicle to allow a customer to test drive the vehicle on a public roadway. In most instances, a vehicle being offered for sale by an automobile dealership has not yet been issued a permanent license plate. The manufacturer of the vehicle provides at least two, and typically, a total of four threaded screw or bolts for attaching a license plate to the rear of the vehicle. In some instances, the dealer uses the threaded fasteners provided by the manufacturer to attach a decorative plate and/or a license plate frame identifying the dealership to the rear of the vehicle.

Regardless, the automobile dealership maintains one or more license plates, commonly referred to as a "dealer plate," for use with vehicles belonging to the dealership. Typically, the fasteners provided by the manufacturer are first unthreaded and the decorative plate and/or license plate frame are removed from the vehicle. The dealer plate is then securely attached to the vehicle by re-threading the manufacturer fasteners through the dealer plate, and optionally, through the decorative plate and/or the license plate frame into the rear of the vehicle. In the case of a test drive, it is desirable for the dealer plate to be attached to the vehicle quickly so that the customer is not kept waiting for an unreasonably long period of time. As a result, the dealer plate (with the decorative plate and/or the license plate frame, if retained) oftentimes is only loosely attached to the vehicle using less than all of the threaded fasteners provided by the manufacturer. Alternatively, the dealer plate may be attached to the rear of the vehicle using one or more magnets. A loosely attached or magnetically attached dealer plate can become detached from the vehicle and lost during the test drive. A lost dealer plate is not only an inconvenience, but is also costly and time consuming for the dealership to replace. In addition, a loosely attached or magnetically attached dealer plate may move during the test drive and damage the finish of the vehicle. A vehicle with a damaged finish is likewise not only an inconvenience to the dealership, but is also costly and time consuming to repair.

In view of the foregoing problems, deficiencies and disadvantages, it is apparent that an improved fastener for readily attaching a first object to a second object is needed. A more particular need exists for a quick-release fastener for readily attaching an object to a fixture or structure. A specific need exists for a quick-release fastener for securely attaching a dealer plate to a vehicle belonging to an automobile dealership such that the dealer plate will not come loose and become lost. A further specific need exists for a quick-release fastener for attaching a dealer plate to a vehicle belonging to an automobile dealership such that the dealer plate can be quickly and easily attached and subsequently removed without damaging the vehicle.

Certain aspects, objects, features and advantages of the present invention will be made apparent and others will be readily understood and appreciated by those skilled in the relevant art, as exemplary embodiments of the invention are described in greater detail with reference to the accompanying drawing figures. It is intended that all such aspects, objects, features and advantages of the invention be encompassed by the scope of the appended claims, given their broadest reasonable construction and interpretation in view of the written description and the accompanying drawing figures. These aspects, objects, features and advantages of the invention, as well as others not expressly disclosed herein, may be accomplished by only one, more than one, all or even none of the exemplary embodiments described herein and illustrated in the accompanying drawing figures. Regardless, it should be appreciated that the particular description of exemplary embodiments and the drawing figures are for illustrative purposes only, and that various alterations, modifications, revisions and substitutions may be made to any of the exemplary embodiments without departing from the intended broad scope of the appended claims given their broadest reasonable construction and interpretation consistent with the written description and accompanying drawing figures.

BRIEF DESCRIPTION OF THE DRAWING FIGURES

The aforementioned aspects, objects, features and advantages of the present invention will be more fully understood and appreciated when considered in conjunction with the accompanying drawing figures, in which like reference characters designate the same or similar parts throughout the several views.

DETAILED DESCRIPTION OF EXEMPLARY EMBODIMENTS OF THE INVENTION

Various exemplary embodiments of a fastener for readily attaching a first object to a second object, or for attaching an object to a fixture or a structure, are described herein with reference to the accompanying drawing figures. Exemplary embodiments of this disclosure are provided to illustrate aspects, objects, features and advantages envisioned by the general concepts of the invention and, as such, are not intended to limit the scope of the invention as defined by the appended claims in any manner. Instead, the appended claims should be given their broadest reasonable construction and interpretation consistent with this written description and accompanying drawing figures. Although one or more particularly advantageous embodiments may be shown and described herein, those having ordinary skill in the art will readily understand and appreciate that numerous alterations, modifications, substitutions and/or revisions may be made thereto without departing from the intended broad scope of the invention, which is to be limited only by the appended claims.

Figure 1:
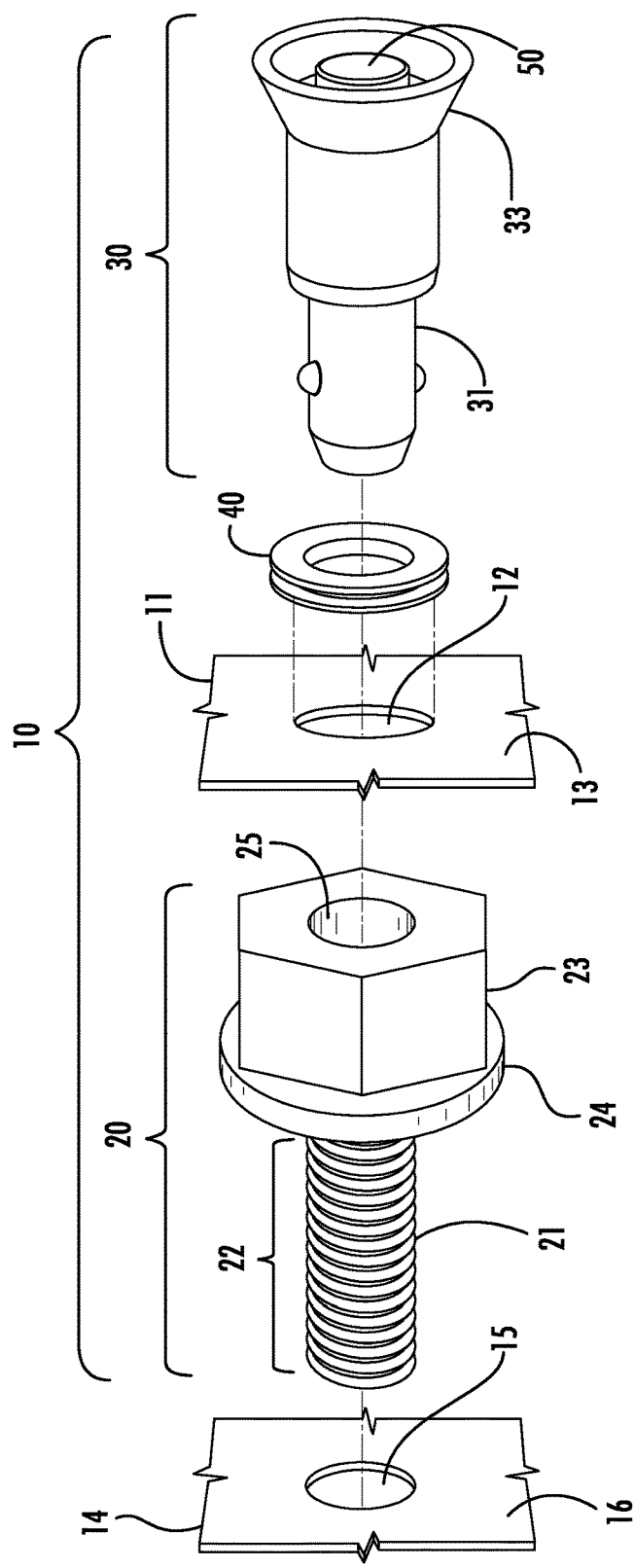
FIG. 1 is an exploded perspective view of a fastener for readily attaching a first object to a second object according to an exemplary embodiment of the present invention with the fastener shown in a disassembled configuration.

FIG. 1 is an exploded perspective view of a fastener, indicated generally by reference character 10, for readily attaching a first object, indicated generally by reference character 11, to a second object, indicated generally by reference character 14, according to an exemplary embodiment of the present invention. The fastener 10 is shown in FIG. 1 in a disassembled configuration. In this embodiment, the fastener 10 is configured for readily attaching the first object 11 to the second object 14 such that the first object 11 can be easily and quickly attached to and removed from the second object 14 without the use of a tool and with a reduced likelihood of damaging the second object 14. By way of example only, the first object 11 may be a sign, plaque or the like, and the second object 14, may be a fixture, such as a machine, or a structure, such as a wall. Regardless, the fastener 10 operates to readily attach the first object 11 to the second object 14 so that the first object 11 can be quickly and easily attached to the second object 14 and subsequently removed from the second object 14. By way of example and not limitation, it may be desirable to quickly and easily attach a warning or instruction sign 11 to a machine 14 without requiring a tool in a manner that reduces the likelihood of damaging the machine 14.

As shown in FIG. 1, the fastener 10 comprises a receiver 20 and an insert 30 that is configured to be inserted into and received within the receiver 20. Receiver 20 comprises a shank portion 21 at one lengthwise end of the receiver 20. For purposes of illustration only, the shank portion 21 of receiver 20 is described and shown herein having lengthwise external threads 22 for engaging with corresponding internal threads (not shown) provided within a through opening, recess, insert or the like 15 of the second object 14. It will be readily understood and appreciated by those skilled in the art that the shank portion 21 of the receiver 20 may alternatively be provided with any other suitable means for securing the receiver 20 to the second object 14, such as barbs, expansion anchors, a tapered punch or the like. The external threads 22 on the shank portion 21 of receiver 20 that engage with corresponding internal threads provided within the opening, recess or insert 15 of the second object 14 are shown herein for convenience only. Likewise, the receiver 20 of the fastener 10 is illustrated herein in the form of a conventional bolt. However, those of ordinary skill in the art will readily understand and appreciate that the receiver 20 of the fastener 10 may likewise be configured in the form of a wood screw, drywall screw, sheet metal screw or the like. For purposes of the intended broad construction and interpretation of the present invention, it is only necessary that the shank portion 21 of the receiver 20 is configured and operable to secure the fastener 10 to the second object 14.

The receiver 20 of the fastener 10 further comprises a head portion 23 at the lengthwise end of the receiver 20 opposite the shank portion 21. Head portion 23 may or may not, as desired, be provided with an annular lip 24 configured to abut against an outer surface 16 of the second object 14 when the shank portion 21 is fully engaged within the opening, recess or insert 15 of the second object 14. If provided, the lip 24 thereby functions as a mechanical stop for the head portion 23 of the receiver 20 against the outer surface 16 of the second object 14. Alternatively, or in addition, an elastomeric mount, standoff, washer, lock washer or the like (not shown) may be disposed between the head portion 23 of the receiver 20 and the outer surface 16 of the second object 14. Regardless, the head portion 23 defines a lengthwise, centrally disposed internal recess 25 extending in the direction of the shank portion 21 of the receiver 20 for receiving the insert 30, as will be described in greater detail hereafter. If desired, the periphery of the head portion 23 may be formed with a standard hexagonal geometry such that a conventional wrench or hex head socket (not shown) can be used to turn the head portion 23 so that the external threads 22 on the shank portion 21 of the receiver 20 engage with the internal threads provided within the opening, recess or insert 15 on the second object 14.

The insert 30 of fastener 10 comprises a shank portion 31 at one lengthwise end and a head portion 33 at the other lengthwise end of the insert 30 opposite the shank portion 31. Shank portion 31 is configured (i.e., sized and shaped) to be inserted through an opening 12 formed in the first object 11 and to be subsequently releasably and removably received within the recess 25 provided in the head portion 23 of the receiver 20. The head portion 33 of the insert 30 is configured (i.e., sized and shaped) to engage with an outer surface 13 of the first object 11. If desired, an optional grommet 40 made of a resilient material, such as an elastomeric plastic, composite or rubber, may be disposed within the opening 12 formed through the first object 11 to prevent the outer surface 13 of the first object 11 from directly contacting the outermost end of the head portion 23 of the receiver 20 and/or the innermost end of the head portion 33 of the insert 30, and thereby reduce the possibility of damage to the outer surface 13 of either side of the first object 11. In one embodiment, a retainer element, such as an elastomeric washer, metal retaining washer or the like (not shown), may alternatively or additionally be disposed on the shank portion 31 of the insert 30 to retain the first object 11 on the insert 30 when the shank portion 31 is not within the receiver 20. If desired, the retainer element may be removed at the time the insert 30 is inserted into the receiver 20. In this manner, the first object 11 is securely retained on the insert 30 by the retainer element alone, or in combination with the grommet 40, to reduce the possibility that the insert 30 may become separated from the first object 11 and then misplaced or lost. Regardless, insert 30 defines a generally hollow interior configured (i.e., sized and shaped) to house a release mechanism 50 operable for releasably engaging the shank portion 31 of the insert 30 with the head portion 23 of the receiver 20, as will be described in greater detail hereafter with reference to FIG. 3.

Figure 2:
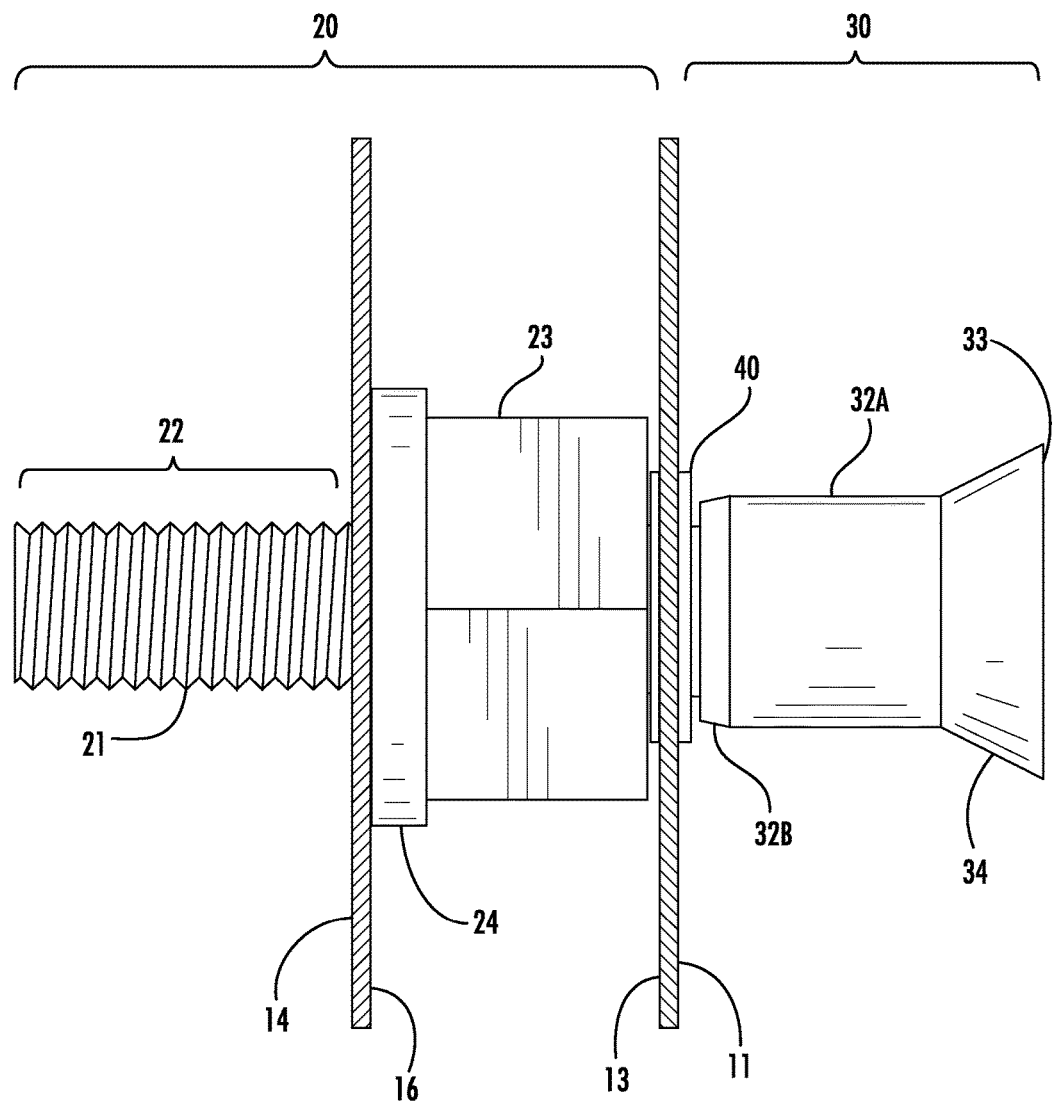
FIG. 2 is a side elevation view of the fastener of FIG. 1 with the fastener shown in an assembled configuration.
Figure 3:
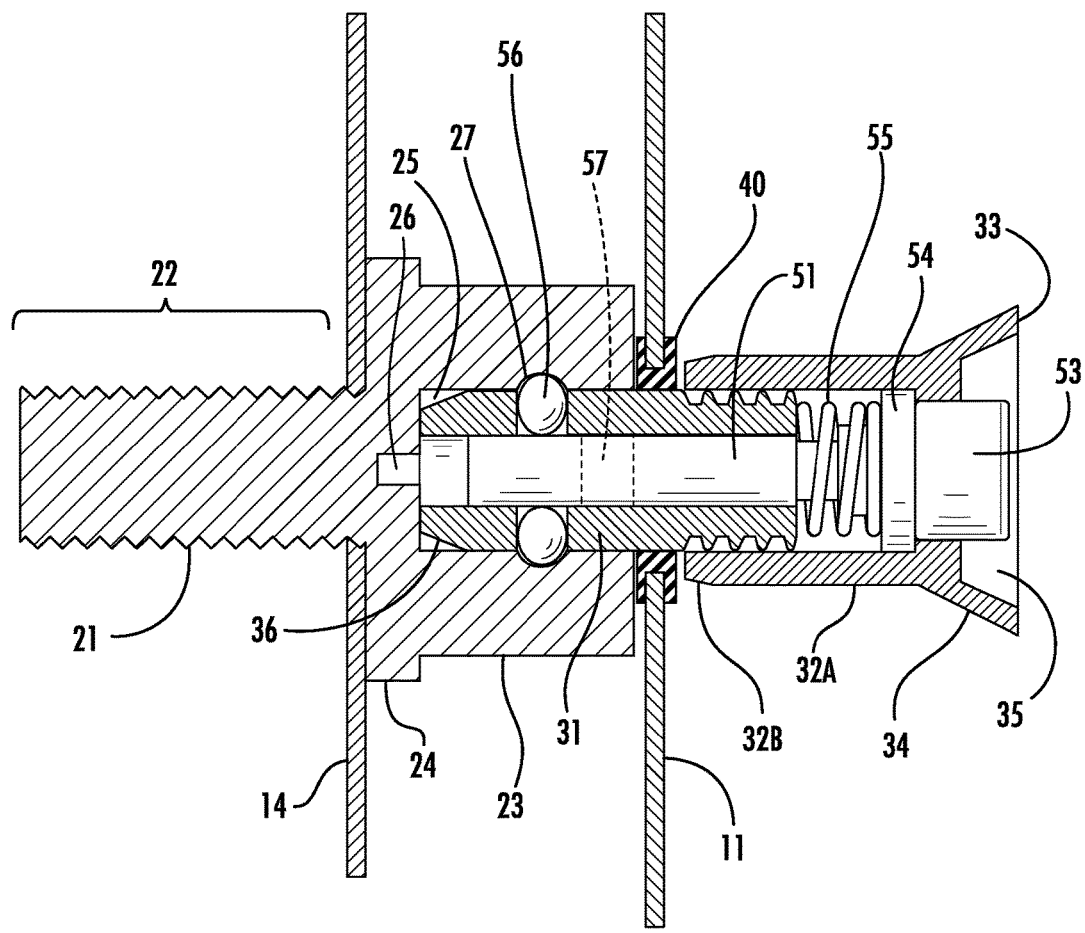
FIG. 3 is a lengthwise sectional view of the fastener of FIG. 1 illustrating an exemplary embodiment of a release mechanism of the fastener.

FIG. 2 is a side elevation view of the fastener 10 shown in an assembled configuration. As described and shown herein, the external threads 22 on the shank portion 21 of the receiver 20 engage with the internal threads provided on the second object 14 to secure the receiver 20 onto the second object 14. As previously mentioned, the shank portion 21 may be threaded onto the second object 14 by turning a hexagonal-shaped outer periphery of the head portion 23 of the receiver using a conventional wench, hex head socket or the like. As shown in FIG. 3, the generally hollow interior of the head portion 23 of the receiver 20 alternatively or additionally may be formed adjacent the shank portion 21 to be engaged by a tool inserted into the receiver 20 through the recess 25 defined by the head portion 23. By way of example and not limitation, the interior of the head portion 23 may be formed with one or more slots 26 configured (i.e., sized and shaped) to be engaged by a standard screwdriver blade or the head of a Phillips-Head screwdriver. In another embodiment, the interior of the head portion 23 may be formed with a hexagonal-shaped recess configured to be engaged by a hex-head driver. In any event, the recess 25 defined by the head portion 23 must be sized sufficiently to receive the conventional tool. Regardless, receiver 20 is preferably threaded onto (or into) the second object 14 until the lip 24 (if provided) of the head portion 23 abuts against the outer surface 16 of the second object 14.

With the receiver 20 secured on the second object 14, the first object 11 is positioned onto the shank portion 31 of the insert 30 (if not already retained thereon) with the optional grommet 40 disposed within the opening 12 formed through the first object 11. Alternatively, as previously described, the first object 11 optionally may be retained on the shank portion 31 of the insert 30 by the retainer element (not shown) such that the insert 30 remains with the first object 11 and the possibility of the insert 30 being misplaced or lost is reduced. Regardless, the shank portion 31 of the insert 30 with the first object 11 positioned thereon is inserted into the recess 25 defined by the head portion 23 of the receiver 20. If necessary, as will be described hereafter with reference to FIG. 3, the release mechanism 50 is activated to cause the shank portion 31 of the insert 30 to engage with the head portion 23 of the receiver 20. As a result, the insert 30 with the first object 11 is thereby releasably attached to the receiver 20, and consequently, to the second object 14.

As will be described hereafter with reference to FIG. 3, the release mechanism 50 is activated again to subsequently remove the insert 30 with the first object 11 from the receiver 20 and the second object 14. As shown and described herein, the head portion 33 of the insert 30 has a lengthwise generally cylindrical surface 32A defining an outer diameter that is larger than the outer diameter of the shank portion 31 of the insert 30. If desired, the head portion 33 of the insert 30 may further have a lengthwise bevel, chamfer or the like 32B between the cylindrical surface 32A and the shank portion 31 of the insert 30 for providing a smooth transition from the head portion 33 of the insert 30 towards the grommet 40. The head portion 33 of the insert 30 may further have a lengthwise increasing diameter taper 34 adjacent the outermost end of the insert 30 that, along with the cylindrical surface 32A, defines a finger grip for inserting the insert 30 into the receiver 20 and removing the insert 30 from the receiver 20.

FIG. 3 is a lengthwise sectional view showing an exemplary embodiment of a release mechanism 50 of the fastener 10. In the exemplary embodiment of the fastener 10 shown and described herein, the release mechanism 50 comprises a shank portion 51 at one lengthwise end and a head portion 53 at the other lengthwise end opposite the shank portion 51. The shank portion 51 is generally cylindrical and is positioned within a generally hollow interior of the shank portion 31 and the head portion 33 of the insert 30. An annular lip 54 is disposed between the shank portion 51 and the head portion 53 of the release mechanism 50. The lip 54 is configured (i.e., sized and shaped) to function as a mechanical stop to thereby retain the shank portion 51 of the release mechanism 50 within the generally hollow interior of the head portion 33 of the insert 30. It should be noted that the shank portion 31 of the insert 30 is affixed to the head portion 33 in a suitable manner, such as by welding, brazing, soldering, fusing or the like, or an adhesive. Alternatively, the shank portion 31 and the head portion 33 of the insert 30 may be formed integrally from a single material.

The release mechanism 50 further comprises a biasing element, for example a conventional coil spring 55 disposed between the lip 54 adjacent the head portion 53 of the release mechanism 50 and the shank portion 31 of the insert 30. The spring 55 is operable to bias the lip 54 of the release mechanism 50 against the interior of the head portion 33 of the insert 30. As such, spring 55 retains the head portion 53 of the release mechanism 50, and consequently the shank portion 51, in a fully outward position, also referred to herein as a "retaining" configuration. The release mechanism 50 further comprises at least one, and preferably a pair, of detent elements 56 configured (i.e., sized and shaped) to engage with an annular recess or groove 27 formed in the head portion 23 of the receiver 20 within the interior of the recess 25. By way of example and not limitation, the detent elements 56 may comprise spherical balls having a relatively small diameter and made of a relatively inelastic material, such as hard plastic, composite or metal (e.g., steel). Regardless, the detent elements 56 are disposed at least partially in the groove 27 formed within the recess 25 of the head portion 23 of the receiver 20 when the shank portion 51 of the release mechanism 50 is in the retaining configuration illustrated in FIG. 3. In the embodiment shown and described herein, a corresponding annular recess 57 is formed in the exterior cylindrical surface at a predetermined medial location along the length of the shank portion 51 of the release mechanism 50. The recess 57 is configured (i.e., sized and shaped) to receive the detent elements 56 of the release mechanism 50 therein when the groove 57 is aligned with the detent elements 56.

In particular, the groove 57 formed in the shank portion 51 is aligned with the detent elements 56 when the release mechanism 50 is moved from the retaining configuration to a "releasing" configuration by pressing the head portion 53 of the release mechanism 50 inwardly against the biasing force of the spring 55. As a result, spring 55 is compressed and the shank portion 51 of the release mechanism 50 is moved within the hollow interior of the shank portion 31 of the insert 30 in the direction of the head portion 23 of the receiver 20. Consequently, the detent elements 56 move from the groove 27 formed within the recess 25 defined by the head portion 23 of the receiver 20 into the groove 57 formed in the shank portion 51 of the release mechanism 50. With the release mechanism 50 in the releasing configuration, the shank portion 31 of the insert 30 may be withdrawn from the head portion 23 of the receiver 20 to detach the first object 11 from the second object 14. Likewise, the shank portion 31 of the insert 30 may be inserted (or re-inserted) into the recess 25 defined by the head portion 23 of the receiver 20 when the release mechanism 50 is in the releasing configuration. It will be readily understood and appreciated that the first object 11 can be attached (or re-attached) to the second object 14 by releasing inward pressure on the head portion 53 of the release mechanism 50 while the detent elements 56 of the shank portion 51 are aligned with the groove 27 formed within the recess 25 of the head portion 23 of the receiver 20 so that the release mechanism 50 returns to the retaining configuration with the detent elements 56 disposed within the groove 27.

As shown in FIG. 3, the head portion 33 of the insert 30 may have a recess 35 formed therein with a predetermined depth to indicate that the head portion 53 is depressed sufficiently to move the release mechanism 50 from the retaining configuration to the releasing configuration wherein the detent elements 56 are aligned with the groove 57 formed in the shank portion 51 of the release mechanism 50. Furthermore, the shank portion 31 of the insert 30 may be provided with a bevel, chamfer or the like 36 configured (i.e., sized and shaped) to facilitate insertion of the shank portion 31 into the recess 25 defined by the head portion 23 of the receiver 20.

It will be readily understood and appreciated by those skilled in the art that other suitable release mechanisms exist for releasably securing insert 30 to receiver 20, and consequently, for releasably attaching first object 11 to second object 14 in a manner that allows the first object 11 to be readily attached to and subsequently removed from the second object 14. By way of example, a quick-release fastener may comprise an insert for being releasably secured within a corresponding receiver. The insert may comprise a shank portion having a radial opening and one or more detent elements that are biased in a radially outward direction by an elastic coil spring disposed within the radial opening. The detent elements may be operable to move inwardly against the biasing force of the coil spring as the shank portion is inserted into a complementary recess defined by a head portion of the receiver. With the shank portion of the insert disposed within the recess of the receiver, the biasing force of the coil spring moves the detent elements outwardly into an annular groove formed within the interior of the recess. The insert is thereby releasably attached to the receiver and can be removed by applying pulling the insert outward with sufficient force to overcome the radially outward biasing force of the coil spring that retains the detent elements within the annular groove formed within the recess defined by the head portion of the receiver. A release mechanism of this alternative type, however, suffers from the disadvantage that the insert can be removed from the receiver by merely grasping and pulling the insert with a sufficient force to overcome the biasing force of the coil spring retaining the detent elements within the annular groove of the receiver. Consequently, the first object can become detached from the second object inadvertently, or can be readily detached by an unauthorized individual intentionally with little effort.

Figure 4:
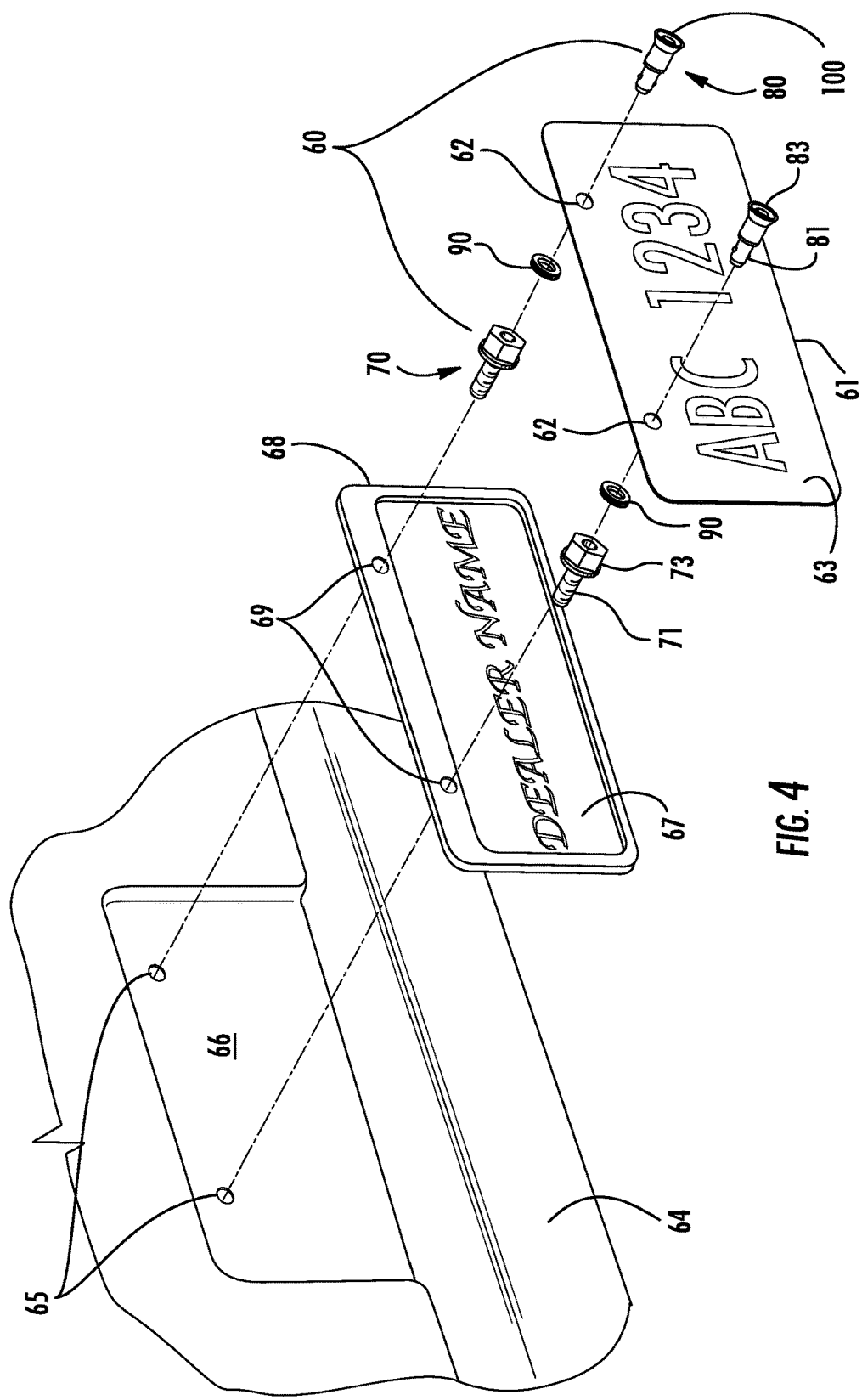
FIG. 4 is an exploded perspective view of a quick-release fastener for readily attaching a dealer plate to a vehicle according to a particularly advantageous embodiment of the present invention with the quick-release fastener shown in a disassembled configuration.

FIG. 4 is an exploded perspective view of a quick-release fastener, indicated generally by reference character 60, for readily attaching a dealer plate, indicated generally by reference character 61, to a vehicle, indicated generally by reference character 64, according to a particularly advantageous embodiment of the present invention. The quick-release fastener 60 is shown in FIG. 4 is in a disassembled configuration. Similar to fastener 10 previously described, quick-release fastener 60 is operable to readily attach the dealer plate 61 to the vehicle 64 in a manner such that the dealer plate 61 can be easily and quickly attached to and subsequently removed from the vehicle 64 without the need for a tool and with a reduced likelihood of damaging a surface 66 of the vehicle 64.

The manufacturer of the vehicle 64 typically provides two or more internally threaded openings, recesses or inserts 65 in the surface 66 of the vehicle 64 and a corresponding plurality of externally threaded screws or bolts (not shown) for attaching a permanent license plate or a temporary license plate, such as dealer plate 61, to the vehicle 64. Only two (2) such internally threaded openings, recesses or inserts 65 are shown herein in FIG. 4 for purposes of illustration. An automobile dealership having the vehicle 64 for sale oftentimes attaches a decorative plate 67 and/or a license plate frame 68 identifying the dealership to the vehicle 64 through corresponding openings 69 using the same threaded screws or bolts provided by the manufacturer. In the event that a customer desires to test drive the vehicle 64 on a public roadway, the automobile dealership removes the threaded screws or bolts provided by the manufacturer and replaces the decorative plate 67 and/or the license plate frame 68 with the dealer plate 61 using the same externally threaded screws or bolts through openings 62 in dealer plate 61 and into the internally threaded openings, recesses or inserts 65 in the surface 66 of the vehicle 64. Alternatively, as illustrated in FIG. 4, the automobile dealership may attach dealer plate 61 to the vehicle 64 over the decorative plate 67 and/or the license plate frame 68 using the threaded screws or bolts provided by the manufacturer in the same manner.

The quick-release fastener 60 of the present invention is used in place of the threaded screws or bolts provided by the manufacturer so that the dealer plate 61 can be readily attached to the vehicle 64 and subsequently removed from the vehicle 64 without the use of a tool and without damaging the surface 66 of the vehicle 64. The automobile dealership first removes the externally threaded screws or bolts provided by the manufacturer from the internally threaded openings, recesses or inserts 65 in the surface 66 of the vehicle 64. As shown in the particularly advantageous embodiment illustrated in FIG. 4, the automobile dealership next attaches the optional decorative plate 67 and/or license plate frame 68 to the vehicle 64 using the externally threaded shank portion 71 of the receiver 70 of each quick-release fasteners 60. If the optional decorative plate 67 and/or license plate frame 68 are used, elastomeric standoffs, washers, grommets or the like may be positioned between the surface 66 of the vehicle 64 and the decorative plate 67 and/or license plate frame 68 to protect the surface 66 of the vehicle 64 from damage. Similarly, elastomeric standoffs, washers, grommets or the like may be positioned between the underside portion of the head portion 73 of the receiver 70 of each quick-release fastener 60 and the decorative plate 67 and/or license plate frame 68.

Regardless, the externally threaded shank portions 71 of the receivers 70 of the quick-release fasteners 60 are threaded into the corresponding internally threaded openings, recesses or inserts 65 in the rear surface 66 of the vehicle 64. As previously mentioned with respect to fastener 10, the head portion 73 of the receiver 70 of each quick-release fastener 60 may be provided with a hexagonal-shaped geometry to be engaged by a conventional wrench or hex head socket. Alternatively, as previously mentioned, the interior of the head portion 73 of the receiver 70 may be formed with one or more slots, such as slots 26 of fastener 10 depicted in FIG. 3, that are configured (i.e., sized and shaped) to be engaged by a standard screwdriver, a Phillips- Head screwdriver or a hex-head driver. In any event, the head portion 73 of the receiver 70 of each quick-release fastener 60 is turned until the shank portion 71 is fully engaged with the corresponding opening, recess or insert 65 in the surface 66 of the vehicle 64. Importantly, it is intended that the receivers 70, with or without the optional decorative plate 67 and/or the optional license plate frame 69, remain on the vehicle 64 until the vehicle 64 is sold. When the vehicle 64 is sold, the automobile dealership will typically replace the receivers 70 with the threaded screws or bolts provided by the manufacturer, or alternatively, may offer the purchaser the option to keep the receivers 70 on the vehicle 64 and use the quick-release fasteners 60 to readily attach a permanent license plate (not shown) to the vehicle 64.

With the receivers 70 of the quick-release fasteners 60 secured to the surface 66 of the vehicle 64, the automobile dealership can use inserts 80 to readily attach the dealer plate 61 to the vehicle 64, for example to allow a customer to test drive the vehicle 64 on a public roadway, and to subsequently remove the dealer plate 61 from the vehicle 64 following the test drive. The automobile dealership attaches the dealer plate 61 to the vehicle 64 by inserting the inserts 80 into the corresponding receivers 70 of the quick-release fasteners 60. As previously mentioned with respect to fastener 10, the dealer plate 61 may be pre-positioned on the shank portions 81 of the inserts 80 and retained thereon by elastomeric grommets 90 and/or by a retaining washer or the like (not shown) for purposes of convenience and to reduce the possibility that the inserts 80 become misplaced or lost. Grommets 90 and/or elastomeric washers or the like may also be positioned between the dealer plate 61 and the head portion 83 of the insert 80 so as to reduce the likelihood of damage to the surface 63 of the dealer plate 61. Regardless, the dealer plate 61 is disposed between the head portion 73 of the receiver 70 and the head portion 83 of the insert 80 of each quick-release fastener 60.

Each quick-release fastener 60 further comprises a release mechanism 100 functionally equivalent to the release mechanism 50 previously described with respect to fastener 10. As such, the dealer plate 61 can be readily attached to the vehicle 64 by pressing the release mechanism 100 of each quick-release fastener 60, inserting the shank portion 81 of the insert 80 into the head portion 73 of the corresponding receiver 70, and then releasing the release mechanism 100 such that the shank portion 81 of the insert 80 is retained within the head portion 73 of the receiver 70 in the manner previously described with respect to fastener 10. Subsequently, the dealer plate 61 can be readily removed from the vehicle 64, for example following the test drive or when the vehicle 64 is sold, by gripping the head portion 83 of the insert 80 of each quick-release fastener 60, pressing the release mechanism 100, and removing the shank portion 81 of the insert 80 from the head portion 73 of the corresponding receiver 70, as previously described with respect to fastener 10.

Figure 5:
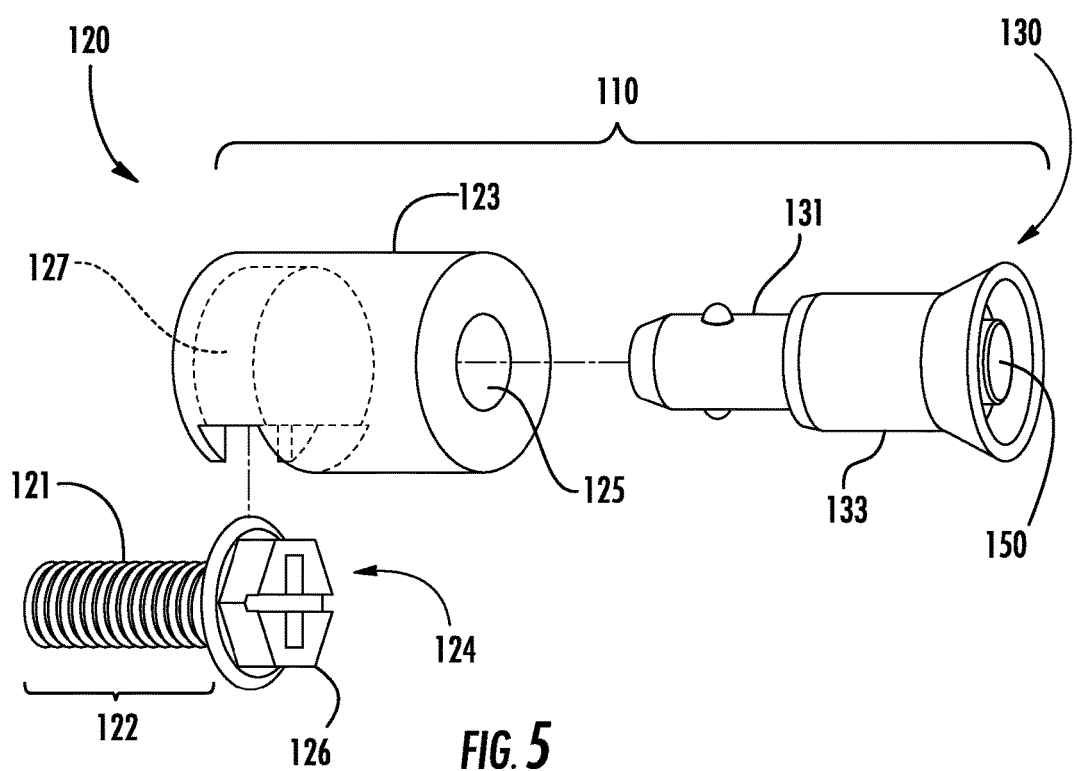
FIG. 5 is an exploded perspective view of an alternative embodiment of a receiver for use with the fastener of FIGS. 1-3 and the quick-release fastener of FIG. 4.

FIG. 5 is an exploded perspective view of an alternative embodiment of a receiver 120 for use with the fastener 10 of FIGS. 1-3 and the quick-release fastener 60 of FIG. 4. The receiver 120 may be used with the fastener 10 in place of the receiver 20 and/or may be used with the quick-release fastener 60 in place of the receiver 70. In either case, a similar fastener, indicated generally by reference character 110, comprises the receiver 120 and a corresponding insert 130. Insert 130 is constructed and functions in the same manner as previously described with reference to insert 30 of fastener 10 and insert 80 of quick-release fastener 60. As such, insert 130 comprises a shank portion 131 and a head portion 133 housing a release mechanism 150 for releasably securing the insert 130 to the receiver 120. Receiver 120 comprises a head portion 123 defining a recess 125 configured for receiving the shank portion 131 of the insert 130 and for engaging the release mechanism 150 in the manner previously described with respect to fastener 10 and quick-release fastener 60. Receiver 120 of fastener 110, however, does not comprise a shank portion corresponding to the shank portion 21 of receiver 20 of fastener 10 and/or the shank portion 71 of the receiver 70 of the quick-release fastener 60. Instead, the head portion 123 of the receiver 120 of fastener 110 defines a radial opening, recess or slot 127 adjacent a lengthwise end of the receiver 120 opposite the recess 125.

The slot 127 of the receiver 120 is configured (i.e., sized and shaped) to receive a conventional screw, bolt or other type of fastener 124 therein. As shown in FIG. 5 and described herein, the fastener 124 comprises a shank portion 121 having lengthwise external threads 122 for engaging with corresponding internal threads, for example within an opening, recess or insert 15 in an object 14, or within an opening, recess or insert 65 of a vehicle 64. The fastener 124 further comprises a head portion 126 having one or more slots configured for receiving a conventional tool such as a standard screwdriver, Phillips-Head screwdriver or hex head driver, to turn the fastener 124 to thereby engage the external threads 122 with the internal threads of the object 14 or the vehicle 64. Accordingly, the head portion 126 of the fastener 124 is received within the radial slot 127 of the receiver 120, or equivalently, the radial slot 127 of the receiver 120 is disposed on the head portion 126 of the fastener 124. A conventional tool is then inserted into the recess 125 defined by the head portion 123 of the receiver 120 and the head portion 126 of the fastener 124 turned to thereby secure the fastener 124, and consequently, the receiver 120 to the object 14 or the vehicle 64. The object 11 can then be releasably attached to the object 14, or the dealer plate 61 can be releasably attached to the vehicle 64, in the manner previously described.

Regardless of the foregoing description and illustration of various exemplary embodiments of the invention, the optimum structure of the invented device, and the manner of use, operation and steps of the invented methods, as well as reasonable equivalents thereof, are deemed to be readily apparent and understood by those skilled in the art. Accordingly, equivalent structures to those shown in the accompanying drawing figures and corresponding functions described in the written description are intended to be encompassed by the present invention and the appended claims, the foregoing being considered as illustrative only of the general concept and principles of the invention. Furthermore, since numerous modifications and changes will readily occur to those skilled in the art, the exemplary embodiments disclosed herein are not intended to limit the invention to the specific configuration, construction, materials, manner of use and operation shown and described. Instead, all reasonably predictable and suitable structural and functional equivalents of the invention, as well as obvious modifications and variants thereto, should be construed as falling within the scope of the invention as defined by the appended claims given their broadest reasonable construction and interpretation in view of the accompanying written description and drawing figures.

That which is claimed is:

1. A fastener for attaching a first object to a second object such that the first object can be attached to the second object and subsequently removed from the second object without use of a tool, the fastener comprising:
   a receiver having a shank portion operable to secure the receiver to the second object and a head portion defining a recess opposite the shank portion, the head portion of the receiver having a larger outer diameter than the shank portion of the receiver such that the head portion of the receiver defines a mechanical stop for the receiver against an outer surface of the second object; and
   an insert having a shank portion configured to be received within the recess of the receiver and a head portion comprising a release mechanism;
   wherein the release mechanism is operable for releasably attaching the insert to the receiver with the first object disposed between the head portion of the receiver and the head portion of the insert and with the first object spaced from the second object by the head portion of the receiver.

2. The fastener according to claim 1, wherein the shank portion of the receiver has external threads for engaging the second object to secure the receiver to the second object.

3. The fastener according to claim 2, wherein the head portion of the receiver has a hexagonal-shaped outer periphery that is configured to be engaged by a conventional tool to turn the head portion and the shank portion of the receiver to thereby secure the receiver to the second object.

4. The fastener according to claim 1, wherein the head portion of the insert has a larger outer diameter than the shank portion of the insert, and wherein the first object is positioned on the shank portion of the insert.

5. The fastener according to claim 4, wherein first object has an opening configured for receiving the shank portion of the insert.

6. The fastener according to claim 5, comprising a grommet disposed within the opening of the first object to retain the first object on the shank portion of the insert.

7. The fastener according to claim 1, wherein the shank portion and the head portion of the insert each has a generally hollow interior, and wherein the release mechanism is disposed within the interior of the shank portion of the insert and the interior of the head portion of the insert.

8. The fastener according to claim 7, wherein the release mechanism has a shank portion and a head portion, and wherein a biasing element is disposed between the head portion of the release mechanism and the shank portion of the insert to bias the release mechanism against the head portion of the insert.

9. The fastener according to claim 8, wherein the release mechanism comprises a detent element, and wherein the head portion of the receiver is configured to engage the detent element to releasably attach the insert to the receiver.

10. The fastener according to claim 9, wherein the shank portion of the release mechanism is configured to release the detent element from engagement with the head portion of the receiver when the head portion of the release mechanism moves inwardly relative to the insert against the bias of the biasing element.

11. A quick-release fastener comprising:
   a receiver having a shank portion at one lengthwise end and a head portion at the other lengthwise end opposite the shank portion, the shank portion of the receiver being configured to secure the receiver to a vehicle, the head portion of the receiver defining a recess and having a larger outer diameter than the shank portion of the receiver such that the head portion of the receiver defines a mechanical stop for the receiver against an outer surface of the vehicle; and
   an insert having a shank portion at one lengthwise end and a head portion at the other lengthwise end opposite the shank portion, the shank portion of the insert being configured to be received within the recess defined by the head portion of the receiver, the head portion of the insert defining a recess configured for receiving a release mechanism within the shank portion of the insert and the head portion of the insert;
   wherein a license plate is disposed between the head portion of the receiver and the head portion of the insert and the license plate is spaced from the vehicle by the head portion of the receiver; and
   wherein the release mechanism is operable for releasably attaching the insert to the receiver such that the license plate can be attached to the vehicle and subsequently removed from the vehicle without use of a tool.

12. The quick-release fastener according to claim 11, wherein the license plate is retained on the shank portion of the insert when the insert is not releasably attached to the receiver.

13. The quick-release fastener according to claim 11, wherein the shank portion of the receiver has external threads, and wherein the head portion of the receiver is configured to receive a conventional tool to secure the receiver to the vehicle.

14. The quick-release fastener according to claim 11, wherein the release mechanism has a shank portion at one lengthwise end and a head portion at the other lengthwise end opposite the shank portion, the release mechanism comprising a biasing element operable to bias the head portion of the release mechanism against an interior of the head portion of the insert.

15. The quick-release fastener according to claim 14, wherein the release mechanism further comprises a detent element operable to engage with the head portion of the receiver to thereby attach the license plate and the insert to the receiver.

16. The quick-release fastener according to claim 15, wherein the release mechanism is operable to be moved inwardly relative to the receiver and the insert against the bias of the biasing element to release the detent element from engagement with the head portion of the receiver and thereby remove the license plate and the insert from the receiver.

17. A fastener for releasably attaching a first object to a second object, the fastener comprising:
   a receiver having a head portion defining a lengthwise recess and a radial slot at a lengthwise end of the receiver opposite the recess, the radial slot configured to be disposed on a head portion of a conventional threaded fastener, the head portion having a larger outer diameter than a threaded portion of the receiver such that the head portion of the receiver defines a mechanical stop for the receiver against an outer surface of the second object;
   an insert having a shank portion at one lengthwise end and a head portion at the other lengthwise end opposite the shank portion; and
   a release mechanism disposed within the insert and operable for releasably attaching the insert to the receiver with the head portion of the conventional threaded fastener received within the radial slot of the receiver and a space defined between the first object and the second object.

18. The fastener according to claim 17, wherein the conventional threaded fastener is operable to secure the receiver to the first object and wherein the release mechanism is operable to releasably attach the second object and the insert to the receiver with the space defined between the first object and the second object.

\* \* \* \* \*